(12) United States Patent
Jiang et al.

(10) Patent No.: US 10,452,663 B2
(45) Date of Patent: Oct. 22, 2019

(54) GROUP USER LEVEL ASSOCIATION METHOD AND SYSTEM

(71) Applicant: TENCENT TECHNOLOGY (SHENZHEN) COMPANY LIMITED, Shenzhen (CN)

(72) Inventors: Weinan Jiang, Shenzhen (CN); Yang Zhang, Shenzhen (CN); Weiquan He, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 426 days.

(21) Appl. No.: 15/194,697

(22) Filed: Jun. 28, 2016

(65) Prior Publication Data

US 2016/0306803 A1    Oct. 20, 2016

Related U.S. Application Data

(63) Continuation of application No. PCT/CN2015/080991, filed on Jun. 8, 2015.

(30) Foreign Application Priority Data

Jun. 10, 2014  (CN) .......................... 2014 1 0256621

(51) Int. Cl.
*G06F 17/30* (2006.01)
*G06F 16/2457* (2019.01)
(Continued)

(52) U.S. Cl.
CPC ........ *G06F 16/24578* (2019.01); *G06F 16/21* (2019.01); *G06F 16/285* (2019.01); *G06F 16/9017* (2019.01); *G06Q 50/01* (2013.01)

(58) Field of Classification Search
CPC ........... G06F 17/30289; G06F 17/3053; G06F 17/30598; G06F 17/30952;
(Continued)

(56) References Cited

U.S. PATENT DOCUMENTS 7,343,365 B2 *  3/2008  Farnham ............... G06F 3/0481
                                                    707/737
7,644,144 B1 *  1/2010  Horvitz .................. G06Q 10/10
                                                    709/203
(Continued)

FOREIGN PATENT DOCUMENTS

CN      101046857 A      10/2007
CN      101207639 A       6/2008
(Continued)

OTHER PUBLICATIONS

International Search Report in International Application No. PCT/CN2015/080991 dated Sep. 2, 2015, 2 pages.
(Continued)

*Primary Examiner* — Miranda Le
(74) *Attorney, Agent, or Firm* — Brinks Gilson & Lione (57) ABSTRACT

A group user level association method may obtain user operation information of each user in a group, match the user operation information with a pre-stored user operation-point weight comparison table to obtain a point weight of each user in the group determining a user level of each user in the group according to the point weight, and associates a user in the group with a user level of the user in the group. In addition, a group user level association system is further provided, the technical solution of the present disclosure, as compared with a user level based on an online duration and an active degree, can more truthfully and objectively reflect a level difference between users in a group, so as to improve efficiency of a group owner or an administrator applying or
(Continued)

managing the group and increase enthusiasm of using a group operation by a user.

13 Claims, 7 Drawing Sheets

(51) Int. Cl.
*G06F 16/21* (2019.01)
*G06F 16/28* (2019.01)
*G06F 16/901* (2019.01)
*G06Q 50/00* (2012.01)

(58) Field of Classification Search
CPC .. G06F 16/24578; G06F 16/21; G06F 16/285; G06F 16/9017; G06Q 50/01
See application file for complete search history.

(56) References Cited

U.S. PATENT DOCUMENTS

| | | | | |
|---|---|---|---|---|
| 8,387,115 | B2* | 2/2013 | Park | H04L 63/102 726/3 |
| 8,793,255 | B1* | 7/2014 | Bilinski | G06F 17/30867 707/740 |
| 8,832,570 | B1* | 9/2014 | Marra | G06F 17/30268 345/619 |
| 9,613,341 | B2* | 4/2017 | Shivakumar | G06Q 10/101 |
| 9,667,783 | B2* | 5/2017 | Salazar | H04M 3/465 |
| 2004/0083389 | A1 | 4/2004 | Yoshida | |
| 2010/0125911 | A1* | 5/2010 | Bhaskaran | G06Q 10/10 726/23 |
| 2010/0162135 | A1* | 6/2010 | Wanas | G06Q 10/10 715/753 |
| 2010/0241599 | A1 | 9/2010 | Yu et al. | |
| 2011/0093474 | A1* | 4/2011 | Etchegoyen | G06Q 30/02 707/748 |
| 2013/0110565 | A1* | 5/2013 | Means, Jr. | G06Q 10/06 705/7.11 |
| 2013/0179951 | A1* | 7/2013 | Broustis | H04L 63/0435 726/6 |
| 2015/0101008 | A1* | 4/2015 | Zent | H04L 63/20 726/1 |

FOREIGN PATENT DOCUMENTS

| | | |
|---|---|---|
| CN | 101465752 A | 6/2009 |
| CN | 102510358 A | 6/2012 |
| CN | 102571630 A | 7/2012 |
| CN | 102663101 A | 9/2012 |
| CN | 103391302 A | 11/2013 |

OTHER PUBLICATIONS

International Preliminary Report on Patentability and Written Opinion in International Application No. PCT/CN2015/080991 dated Dec. 15, 2016, 4 pages.

Office Action from Chinese Application No. 2014102566216 dated Nov. 13, 2018.

Tieba, "How to Upgrade Quickly," Baidu Experience, Dec. 12, 2012, printed from the internet at https://jingyan.baidu.com/article/9f63fb91cc9b9cc8400f0ef7.html with concise English translation of abstract, 4 pages.

Office Action dated Apr. 25, 2019 for Chinese Application No. 201410256621.6 with concise explanation, 8 pages.

* cited by examiner

GROUP USER LEVEL ASSOCIATION METHOD AND SYSTEM

This application is a continuation of International Application No. PCT/CN2015/080991, filed on Jun. 5, 2015. This application claims the priority benefit of Chinese Patent Application No. 201410256621.6, entitled "GROUP USER LEVEL ASSOCIATION METHOD AND SYSTEM", filed on Jun. 10, 2014, the content of which is incorporated by reference herein in its entirety for all purposes.

FIELD OF THE TECHNOLOGY

The present invention relates to the field of Internet technologies, and in particular, to a group user level association method and system.

BACKGROUND OF THE DISCLOSURE

With the rapid development of Internet applications, in network communities (online communication spaces in forms including a BBS/forum, Tieba, a bulletin board, a group discussion, an online chat, friend making, a personal space, and a wireless value-added service), network instant communication tools (a service capable of instantly sending and receiving an Internet message and the like), and the like, a function of a group has become very important, the so-called group is a service platform for multi-person communication, and by joining the service platform, a user could broadcast speaking to all users in the group, group-sending a file, and upload a picture to a group album, which greatly enriches instant communication manners of the user.

In an instant communication tool or a network community application, in order to distinguish statuses of users, user levels are usually used, and users of respective levels have different exclusive rights. At present, general setting of a user level is mainly determined according to an online duration and an active degree of a user, and the user level associated with the user appears with the user in various applications. However, for a user in a group, because functions, communication manners, and actual user numbers of different groups are greatly different, if the user level of the user based on an online duration and an active degree is continued to be used, a level difference between users in the group cannot be truthfully and objectively reflected, so that more limitations would be brought to exclusive rights of group users in the group and management of a group owner or an administrator on the group, thereby reducing application and management efficiency of the group. Meanwhile, because the user levels associated with the users cannot objectively reflect a user difference, enthusiasm of using a group operation by a user is also dampened, thereby affecting user experience.

SUMMARY

On the basis of the above, a group user level association method and system are provided to truthfully reflect a level difference between users in a group and improve efficiency of a group owner or an administrator applying or managing the group.

One aspect of the disclosure involves a group user level association method. The method includes obtaining user operation information of each user in a group, matching the user operation information with a pre-stored user operation-point weight comparison table to obtain a point weight of each user in the group, determining a user level of each user in the group according to the point weight, and associating a user in the group with a user level of the user in the group.

Another aspect of the disclosure involves a group user level association system. The system includes one or more processors, a memory, and one or more program modules stored in the memory and executed by the one or more processors. The one or more program modules includes: a user operation obtaining module, configured to obtain user operation information of each user in a group; an operation-point matching module, configured to match the user operation information with a pre-stored user operation point weight comparison table to obtain a point weight of each user in the group; a user level determining module, configured to determine a user level of each user in the group according to the point weight; and a user level associating module, configured to associate a user in the group with a user level of the user in the group.

As compared with a user level based on an online duration and an active degree, the foregoing group user level association method and system can more truthfully and objectively reflect a level difference between users in a group, so as to improve efficiency of a group owner or an administrator applying or managing the group and increase enthusiasm of using a group operation by a user, thereby enhancing user experience.

BRIEF DESCRIPTION OF THE DRAWINGS

The aforementioned features and advantages of the disclosure as well as additional features and advantages thereof will be more clearly understood hereinafter as a result of a detailed description of preferred embodiments when taken in conjunction with the drawings.

DESCRIPTION OF EMBODIMENTS

Specific implementation manner of a group user level association method and system of the present disclosure are described in detail below with reference to the accompanying drawings.

The group user level association method and system of the present disclosure provide a group user level association technical solution, solve technical problem that an existing group user level association technique cannot truthfully and objectively reflect a level difference between users in a group, resulting in influence on efficiency of a group owner or an administrator applying or managing a group, and improve enthusiasm of using a group operation by a user, thereby enhancing user experience.

On the basis of that, this technical solution is applicable to Internet applications such as network community and a network instant communication tool (for example, QQ), group member level rating mechanism is further set to further improve efficiency of application and management on a group and improve use enthusiasm of a user and user experience.

Figure 1:
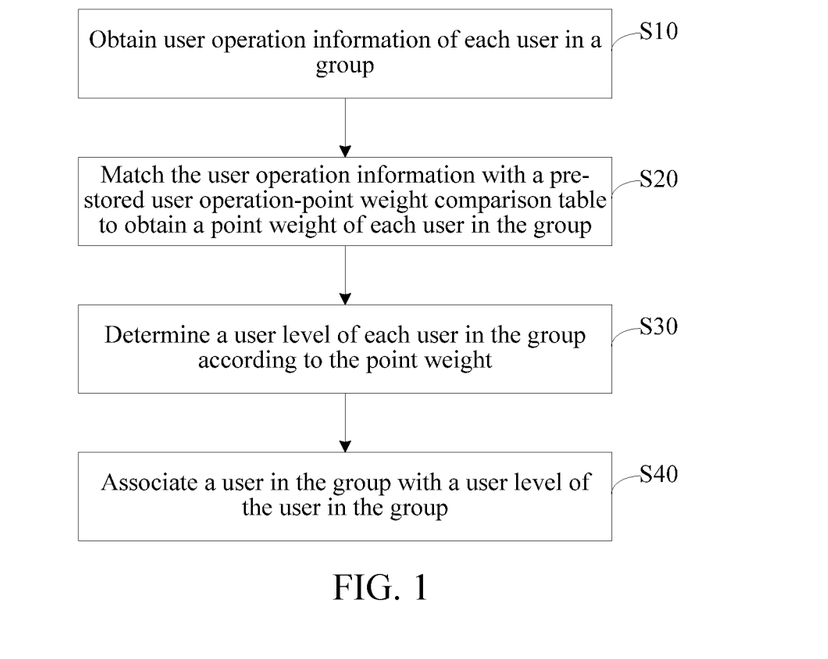
FIG. 1 is a flowchart of a group user level association method according to an embodiment.

Referring to FIG. 1, FIG. 1 is a flowchart of a group user level association method according to an embodiment, including:

Step S10: Obtain user operation information of each user in a group.

In this step, a system can record, according to a user operation function provided by a group and used by each user that logs in to a client in the group, information related to operation application.

Figure 2:
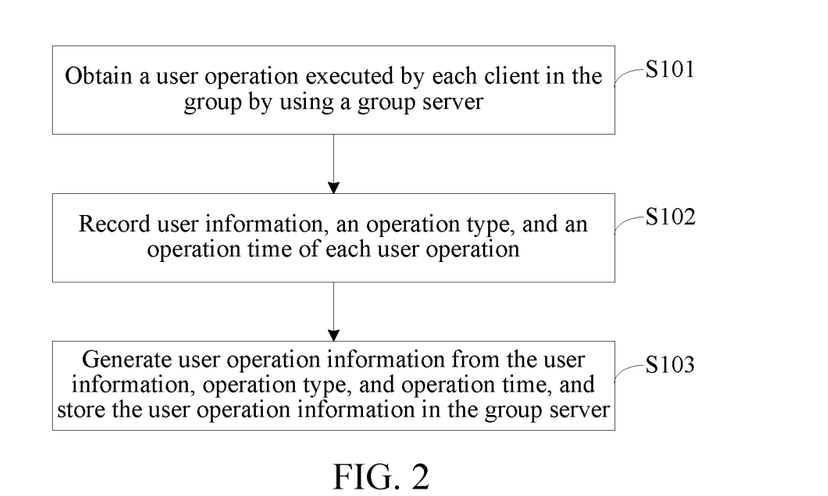
FIG. 2 is a flowchart of obtaining user operation information according to an embodiment.

In an embodiment, with regard to a step of obtaining user operation information in step S10, referring to FIG. 2, FIG. 2 is a flowchart of obtaining user operation information according to an embodiment, which may specifically include the following:

Step S101: Obtain a user operation executed by each client in the group by using a group server, where the group server provides a calculation service for clients in the group and responds to an operation request of a user, and operations of all users can be obtained by using the group server.

Step S102: Record user information, an operation type, and an operation time of each user operation, where the operation type generally may include speaking, group file application, group album application, a group check-in, or another group application function.

Step S103: Generate user operation information from the user information, operation type, and operation time, and store the user operation information in the group server, where the generated user operation information may be stored in a set format into the server, so as to facilitate storage and querying, and is used in a subsequent accumulated point weight calculation process.

Step S20: Match the user operation information with a pre-stored user operation-point weight comparison table to obtain a point weight of each user in the group.

In this step, the user operation information executed by each user is matched according to the obtained user operation information by using the pre-stored user operation-point weight comparison table, and a point weight of each user in the group is individually accumulated; for the user operation-point weight comparison table, a common comparison table form may be used, and a number of point weights corresponding to a user operation may be configured; in addition, one day may be used as a calculation cycle for the point weight, an upper limit of the point weight that can be accumulated per day is set, so as to avoid phenomena, such as malicious speaking and spamming, thereby ensuring objectivity of accumulating a point weight by a user.

The user operation-point weight comparison table may be configured or generated by a creator or administrator of the group, so as to perform personalized management, thereby further ensuring objectivity of accumulating a point weight by a user.

In an embodiment, a group user level association method according to this embodiment may further include:

selecting, according to a configuration operation executed by a client, a user operation type used for accumulating a point weight, where the client is a client to which a creator or an administrator of the group logs in.

generating, according the selected user operation type and a preset point weight corresponding thereto, a user operation-point weight comparison table and storing the user operation-point weight comparison table in the group server.

Generation is performed by means of configuration performed by the creator or administrator of the group, and personalized management can be performed for groups having different functions according to configured types of the groups, so that objectivity of accumulating a point weight by a user can be presented in a better way.

In addition, a method for accumulating a point weight of a user may be designed to be an adjusting manner by combining a basic point weight and a point weight coefficient; in this way, for a continuously active user, a proper encouraging approach is provided, and group use enthusiasm of the user is improved.

Figure 3:
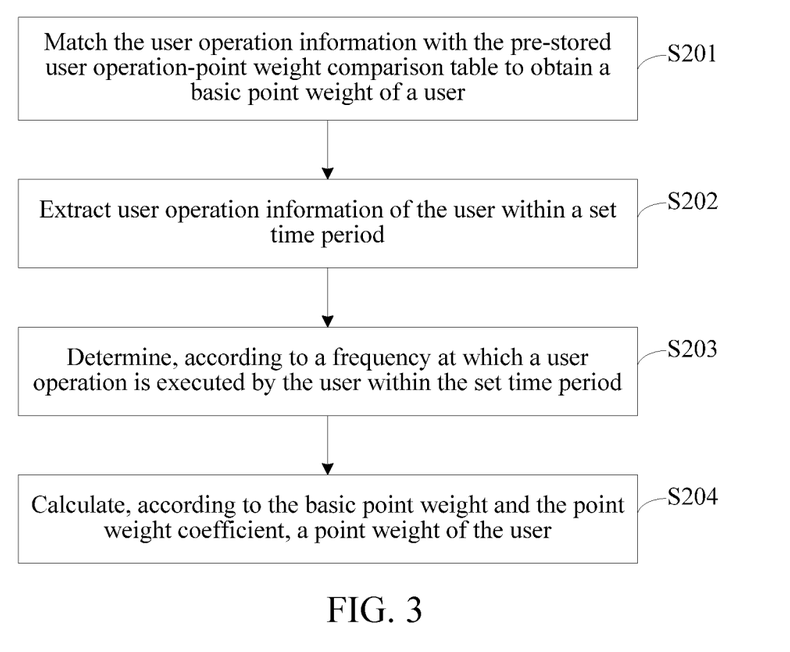
FIG. 3 is a flowchart of obtaining a user point weight according to an embodiment.

In an embodiment, with regard to a step of obtaining a user point weight in step S20, referring to FIG. 3, FIG. 3 is a flowchart of obtaining a user point weight according to an embodiment, which may specifically include the following:

Step S201: Match the user operation information with the pre-stored user operation-point weight comparison table to obtain a basic point weight of a user, where number of times speaking is made in the group, a number of times a group file is applied, a number of times a group album is applied, a number of group check-ins, or a number of times another group application function is used may be used as a basis for accumulating a point weight.

An example of the user operation-point weight comparison table can be shown in Table 1:

TABLE 1

| User operation | Obtain point weight | Upper limit on that day |
|---|---|---|
| Speaking in a group | 1 | 5 |
| Uploading a file to a group | 1/time | 30 |
| File being downloaded | 5/time | |
| Uploading a picture to a group | 1/time | 10 |
| Group check-in | For continuous 15 days, obtaining 15 point weights on that day, and for continuous 30 days, obtaining 40 point weights on that day | 40 |
| Completing a group task | Customized point weight | 50 |

The user operation used for accumulation may include: speaking in the group, uploading a file to the group, a file being downloaded, uploading a picture to the group, a group check-in, completing a group task, and the like.

Step S202: Extract user operation information of the user within a set time period, where data of the user within a time period may be computed according to the user operation information obtained in step S10.

Step S203: Determine, according to a frequency at which a user operation is executed by the user within the set time period, a current point weight coefficient of the user.

The current point weight coefficient of the user may be a point weight coefficient of one of the user operations and may also be a point weight coefficient of multiple or all of the user operations, and the point weight coefficient may be used for calculating a point weight on that day.

Step S204: Calculate, according to the basic point weight and the point weight coefficient, a point weight of the user.

A manner of calculating the point weight of the user is multiplying the basic point weight by the point weight coefficient, and by means of configuring different point weight coefficients, a continuously active user may be encouraged properly to improve group use enthusiasm of the user.

For example, a user operation is judged by using a user operation-point weight comparison table to obtain a basic point weight, which includes: a basic point weight for speaking, a basic point weight for uploading a file, a basic point weight for a file being downloaded, a basic point weight for uploading a picture, a basic point weight for a group check-in, and a basic point weight for completing a group task.

After the step of extracting user operation information of the user within a set time period, a maximum of a number of continuous speaking days of the user within the set time period is further determined, and a point weight coefficient for speaking of a current user is set according to the maximum.

With regard to the point weight coefficient for speaking of the current user, referring to Table 2, Table 2 is an example of setting a point weight coefficient for speaking.

TABLE 2

| Maximum of a number of continuous speaking days | Point weight coefficient for speaking |
|---|---|
| 0 < x <= 3 | 1 |
| 3 < x <= 7 | 1.2 |
| 7 < x <= 15 | 1.4 |
| 15 < x <= 25 | 1.6 |
| >=25 | 2 |

Table 2 illustrates an maximum of a number of continuous speaking days of a user in the past 30 days and a point weight coefficient for speaking corresponding thereto.

After the basic point weight and the point weight coefficient for speaking are obtained, a point weight of the user is calculated according to the following formula:

$$Q = Q_0 * a + \Sigma Q_n + S, n \in (1,5)$$

where $Q$ is a point weight of the user, $a$ is the point weight coefficient for speaking, $Q_0$ is the basic point weight, $Q_1$ is the basic point weight for uploading a file, $Q_2$ is the basic point weight for a file being downloaded, $Q_3$ is the point weight for uploading a picture, $Q_4$ is the basic point weight for a group check-in, $Q_5$ is the basic point weight for completing a group task, and $S$ is a set bonus point weight for the number of continuous speaking days.

Further, with regard to the bonus point weight, the bonus point weight is a negative value if the maximum of the number of continuous speaking days is less than a preset first threshold; and the bonus point weight is a positive value if the maximum of the number of continuous speaking days is greater than a preset first threshold.

Setting of the bonus point weight may be configured at the background, for example, in the past 30 days, if a maximum of a number of continuous speaking days of a user is 0, the bonus point weight may be set to −5.

By means of associating the bonus point weight with the maximum of the number of continuous speaking days, a continuous active duration of a user can be properly encouraged and group use enthusiasm of the user is improved.

In addition, a lowest user point of the user can also be set to 0, and if the current point is 0, no negative point is recorded, and if only a smallest integer part of the point weight on that day is displayed, the part following a decimal point is added into point weight accumulation on the next day, an integer obtained by accumulation is displayed.

Step S30: Determine a user level of each user in the group according to the point weight.

In this step, an active degree of each user in the group is obtained according to an accumulated point weight, and a user level of a user in the group is further determined according to the active degree.

Figure 4:
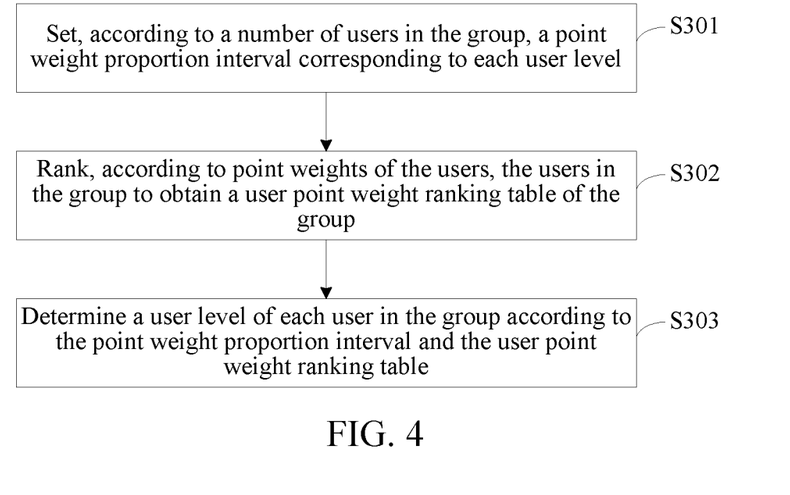
FIG. 4 is a flowchart of determining a user level of a user in a group according to an embodiment.

In an embodiment, with regard to a step of determining a user level of a user in a group in step S30, referring to FIG. 4, FIG. 4 is a flowchart of determining a user level of a user in a group according to an embodiment, which may specifically include the following:

S301: Set, according to a number of users in the group, a point weight proportion interval corresponding to each user level.

Referring to Table 3, Table 3 is an example of setting a point weight proportion interval.

TABLE 3

| Point weight proportion interval | Level tag (level/title) |
|---|---|
| Point weight being 0 | LV1/Diving |
| 40% | LV2/Bubbling |
| 30% | LV3/Spitting |
| 20% | LV4/Active |
| 7% | LV5/Talkative |
| 3% | LV6/Legend |

In Table 3, the point weight proportion interval may be configured according to a number of users in a group, so as to set a proper proportion, and by means of proportionally dividing user levels dynamically, a user level may ascend or descend, so that a sense of difference between user levels in the group can be always kept.

S302: Rank, according to point weights of the users, the users in the group to obtain a user point weight ranking table of the group.

S303: Determine a user level of each user in the group according to the point weight proportion interval and the user point weight ranking table.

In this step, levels may be calculated according to a number of actual users in the group from the top to the bottom, and a calculation process may be appropriately adjusted, for example, if the number of users of a high user level is less than 1, the group does not have this user level, and the number of users of a LV2 level is the number of users having a point weight minus the number of users of the four user levels above (LV3 to LV6).

In addition, if user levels of the group are above LV5, genders and the like may also be set for the current group, so as to further enhance personalized application of the group user level.

Step S40: Associate a user in the group with a user level of the user in the group.

In this step, on the basis of the user level in the group determined in the technical solution of step S30, the user level is associated with a corresponding user in the group, the user level can truthfully and objectively reflect a level difference between users in a group, so as to enable a group owner or an administrator to have higher application or management efficiency when applying or managing the group, and in addition, the user level truthfully reflects an active degree of a user in a group, thereby improving enthusiasm of a user using a group operation and enhancing user experience.

Figure 5:
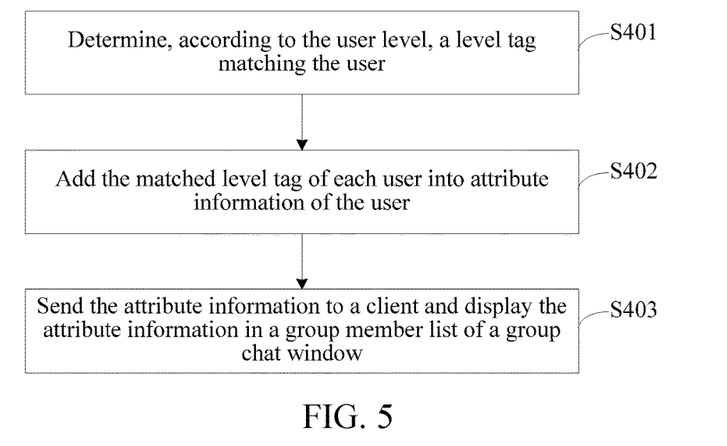
FIG. 5 is a flowchart of associating a user level with a user according to an embodiment.

In an embodiment, with regard to a step of associating a user level with a user in step S40, referring to FIG. 5, FIG. 5 is a flowchart of associating a user level with a user according to an embodiment, which may specifically include the following:

Step S401: Determine, according to the user level, a level tag matching the user, where each user level in the group matches at least one level tag; with regard to the level tag, as shown in FIG. 3, tag information, such as a level or a title, may be set.

Step S402: Add the matched level tag of each user into attribute information of the user, where the attribute information indicates relevant information displayed on a client for distinguishing a user.

Step S403: Send the attribute information to a client and display the attribute information in a group member list of a group chat window, where by then, a user level of each user can be displayed in the group member list, meanwhile, a point weight in the group is also added to the attribute information and also displayed in the group member list, and a user level and a point weight can truthfully and objectively reflect a level difference between users in a group.

In an embodiment, in order to improve an autonomous group operating capability of a user, the group user level association method according to this disclosure may further include:

editing, according to a configuration operation executed by a client, level tag information of the user in the group and updating the level tag information to the attribute information of the user, where the client is a client to which a creator or an administrator of the group logs in.

According to a processing step of the foregoing embodiment, a creator or an administrator of a group can edit level or title information shown in FIG. 3 by logging in to a client, thereby improving a capability and efficiency of managing the group by the creator or administrator of the group.

In an embodiment, in order to reduce influence of a user chat, the group user level association method according to this disclosure may further include:

setting, according to a configuration operation executed by a client, a display state of the level tag information of the user in the group member list, where the client is a client to which a creator or an administrator of the group logs in.

According to a processing step of the foregoing embodiment, a creator or an administrator of a group can set a display state of a level tag (a level/title) of a group member in a chat window, for example, setting it to be visible or invisible, thereby prevent a user chat from being disturbed.

In an embodiment, in order to improve efficiency of a query operation on a group user, the group user level association method according to this disclosure may further include:

obtaining a query operation of the client and performing grouped arrangement on the users in the group according to user levels to obtain a grouped display layout of the group; and displaying, according to the grouped display layout, the group member list on the group chat window.

According to a processing step of the foregoing embodiment, a creator, an administrator, or a common user of a group may find users of different active degrees by means of queries by logging into a client. Because in the technical solution of the present disclosure, the user level associated with the group user can truthfully and objectively reflect a level difference between users in a group, when managing the group, the creator, administrator, or common user of the group may quickly and accurately find correct user information by means of queries, and the user may also acquire the level difference in the group by querying user levels of other users.

In an embodiment, in order to reduce influence exerted by a user from leaving a group because of a misoperation or a malicious operation, user levels in a group, the group user level association method according to this disclosure may further include:

obtaining user information, a leave time, and a user level of a user leaving the group and storing them in a group server;

associating, if the user rejoins the group within a set time, the user level of the user when leaving the group with the user and recovering a point weight of the user; and associating, if the user rejoins the group outside a set time, a lowest user level of the group with the user and setting the point weight of the user to 0.

According to a processing step of the foregoing embodiment, with regard to a user leaving the group, a user level of the user in the group may be preserved within a set time period, thereby avoiding loss brought by leaving a group because of malicious hacking or a mis-operation, and a user can re-obtain the original user level as long as the user rejoins the group within the set time period.

In an actual application process of the technical solution, adaptation and adjustment may be performed according to an application scenario, for example, it can be set as that if a group user rejoins the group within 72 hours after the group user leaves the group, the group user can still obtain a historical level thereof (a certain point weight may be reduced if a condition is satisfied); for a group user that rejoins the group after 72 hours, the user level is associated to a lowest level, and the point weight is accumulated from 0.

In an embodiment, after a step of associating a user level with a user in S40, a group user level association method according to the present disclosure may further include:

setting a operation application right for each user level in the group;

associating, according to a user level of each user in the group, each user in the group with an operation application right corresponding to the each user; and responding, when receiving an operation application service request initiated by a user, to the operation application service request according to the operation application right associated with the user.

In processing steps of the foregoing embodiment, an operation application right of a user may be set according to a user level; generally speaking, a user level based on an online duration and an active degree cannot objectively reflect an active degree of a user in a group; however, in the technical solution of the present disclosure, a user level associated with a user truthfully and objectively reflect a level difference between users in a group; therefore, setting the operation application right according to the user level not only can enable a user having a high active degree in the group to obtain more application rights, but also can reduce operation application rights of a user having a low active degree at the same time, thereby reducing resource waste caused by a user operation on a group server and improving a utilization ratio of server resources while ensuring quality of service at the same time.

When the technical solution based on the present disclosure is applied to an Internet application such as a network community or a network instant communication tool, the following processing mechanisms may also be set:

(1) A user operation is a sum of the number of times the user operation is executed on a computer terminal and a mobile terminal.

(2) A point weight is not accumulated for a visit of an open group.

(3) A creator or an administrator of a group may set a special guest user, and a user level association manner of the special guest user may depart from an inherent system mechanism and may be customized by the creator or administrator of the group.

(4) A creator, an administrator, and a special guest user may depart from an inherent level system.

(5) An accumulated point weight of a user in a certain group is only effective to the current group, and the point weights are not equal in different groups.

(6) A creator or an administrator of a group may set whether a user level of a title in the present group is visible on a group chat window.

By means of the foregoing processing mechanism, efficiency of applying or managing a group by a creator or an administrator of the group may be further improved, and use enthusiasm of a user and user experience may be improved.

Figure 6:
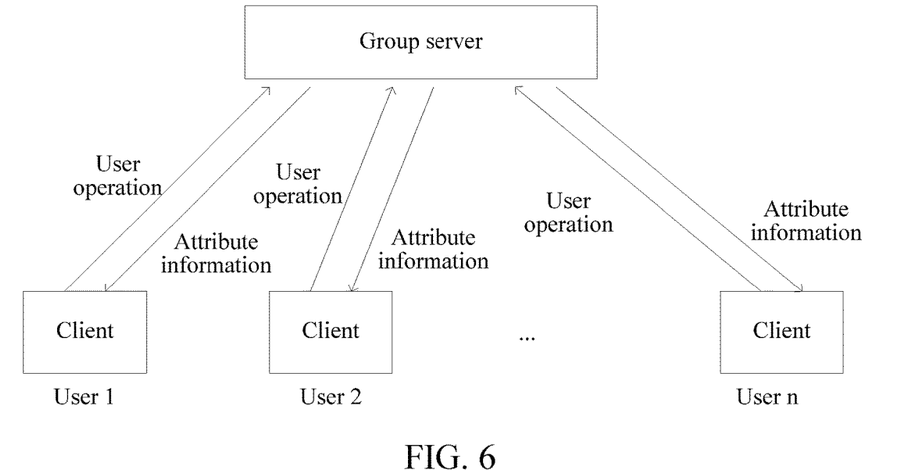
FIG. 6 is a block diagram of a system for implementing a group user level association method.

The group user level association method of the present disclosure may be implemented on the basis of an architectural system shown in FIG. 6. FIG. 6 is a block diagram of a system for implementing a group user level association method. Users (1 to n) implement operations in a group by logging in to clients; a group server responds to operations of all users in the group, records user operation information, accumulate a point weight of each user according to the user operation information, and determines a user level; the group server further associates the determined user level with a corresponding user and sends a level tag corresponding to the user level with attribute information of the user to the client for display; in this way, a user in the group can have tag information capable of truthfully and objectively reflecting a level difference between users in the group, thereby improving a capability and efficiency of managing the group by a creator or an administrator of the group and meanwhile, encouraging users in the group and increasing an active degree in the group.

Figure 7:
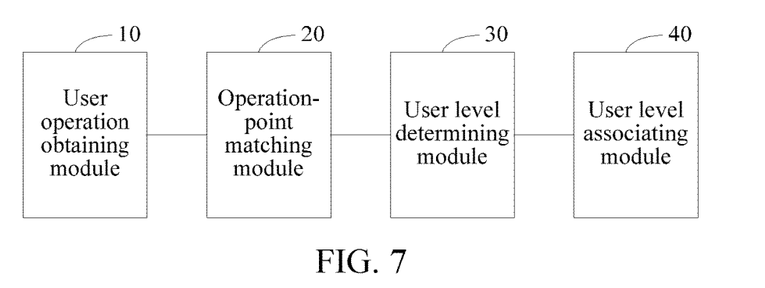
FIG. 7 is a structural schematic diagram of a group user level association system according to an embodiment.

Referring to FIG. 7, FIG. 7 is a structural schematic diagram of a group user level association system according to an embodiment, including a user operation obtaining module 10, an operation-point matching module 20, a user level determining module 30, and a user level associating module 40.

The user operation obtaining module 10 is configured to obtain user operation information of each user in a group.

The user operation obtaining module 10 can record, according to a user operation function provided by a group and used by each user that logs in to a client in the group, information related to operation application.

Figure 8:
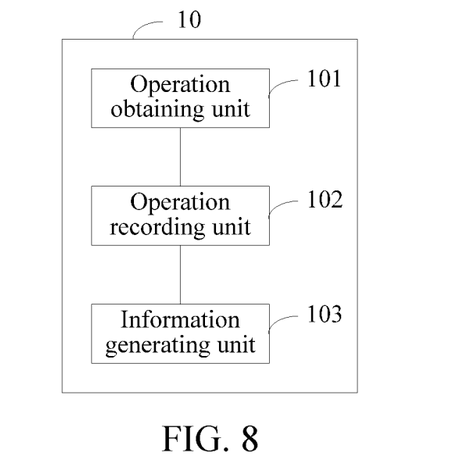
FIG. 8 is a structural schematic diagram of a user operation obtaining module according to an embodiment.

In an embodiment, referring to FIG. 8, FIG. 8 is a structural schematic diagram of a user operation obtaining module according to an embodiment, the user operation obtaining module 10 may further include:

an operation obtaining unit 101, configured to obtain a user operation executed by each client in the group by using a group server;

an operation recording unit 102, configured to record user information, an operation type, and an operation time of each user operation; and an information generating unit 103, configured to generate user operation information from the user information, operation type, and operation time, and store the user operation information in the group server.

The operation-point matching module 20 is configured to match the user operation information with a pre-stored user operation point weight comparison table to obtain a point weight of each user in the group.

The operation-point matching module 20 can match, according to the user operation information obtained by the user operation obtaining module 10, user operation information executed by each user by using the pre-stored user operation-point weight comparison table, and individually accumulate a point weight of each user in the group; for the user operation-point weight comparison table, a common comparison table form may be used, and a number of point weights corresponding to a user operation may be configured; in addition, one day may be used as a calculation cycle for the point weight, an upper limit of the point weight that can be accumulated per day is set, so as to avoid phenomena, such as malicious speaking and spamming, thereby ensuring objectivity of accumulating a point weight by a user.

Figure 9:
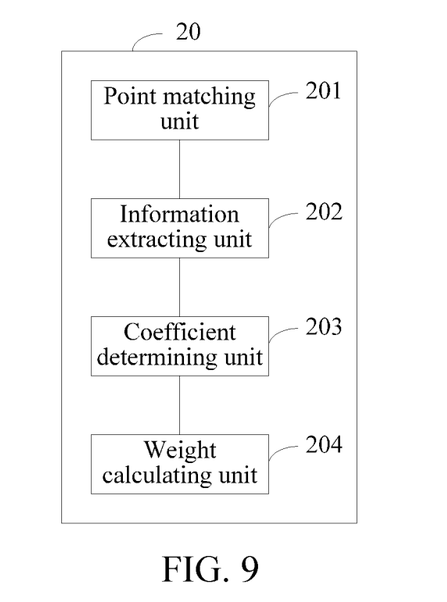
FIG. 9 is a structural schematic diagram of an operation-point matching module according to an embodiment.

In an embodiment, referring to FIG. 9, FIG. 9 is a structural schematic diagram of an operation-point matching module according to an embodiment, the operation-point matching module 20 may further include:

a point matching unit 201, configured to match the user operation information with the pre-stored user operation-point weight comparison table to obtain a basic point weight of a user;

an information extracting unit 202, configured to extract user operation information of the user within a set time period;

a coefficient determining unit 203, configured to determine, according to a frequency at which a user operation is executed by the user within the set time period, a current point weight coefficient of the user; and a weight calculating unit 204, configured to calculate, according to the basic point weight and the point weight coefficient, a point weight of the user.

The user operation may include: speaking in the group, uploading a file to the group, a file being downloaded, uploading a picture to the group, a group check-in, completing a group task, and the like.

In an embodiment, the basic point weight may include: a basic point weight for speaking, a basic point weight for uploading a file, a basic point weight for a file being downloaded, a basic point weight for uploading a picture, a basic point weight for a group check-in, and a basic point weight for completing a group task.

Figure 10:
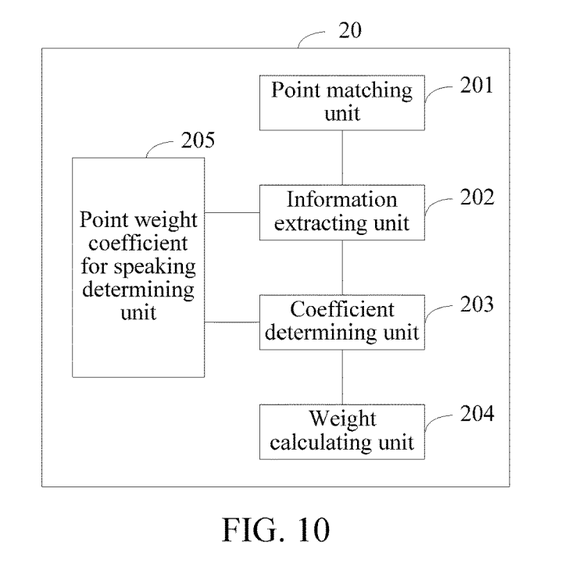
FIG. 10 is a structural schematic diagram of an operation-point matching module according to another embodiment.

Referring to FIG. 10, FIG. 10 is a structural schematic diagram of an operation-point matching module according to another embodiment, where the information extracting unit 202 further includes: a point weight coefficient for speaking determining unit 205, configured to determine a maximum of a number of continuous speaking days of the user within the set time period, and set, according to the maximum, a current point weight coefficient for speaking of the user.

The weight calculating unit 204 is configured to calculate, according to the basic point weight and the point weight coefficient, a point weight of the user, where the process includes the following formula:

$$Q=Q_0*a+\Sigma Q_n+S, n\in(1,5)$$

where Q is a point weight of the user, a is the point weight coefficient for speaking, $Q_0$ is the basic point weight, $Q_1$ is the basic point weight for uploading a file, $Q_2$ is the basic point weight for a file being downloaded, $Q_3$ is the point weight for uploading a picture, $Q_4$ is the basic point weight for a group check-in, $Q_5$ is the basic point weight for completing a group task, and S is a set bonus point weight for the number of continuous speaking days.

Further, the weight calculating unit 204 is further configured to judge the maximum of the number of continuous speaking days determined by the point weight coefficient for speaking determining unit 205, wherein the bonus point weight is a negative value if the maximum of the number of continuous speaking days is less than a preset first threshold; and the bonus point weight is a positive value if the maximum of the number of continuous speaking days is greater than a preset first threshold.

Figure 11:
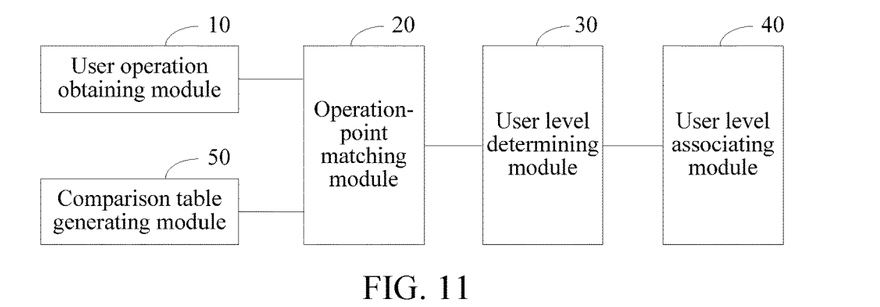
FIG. 11 is a structural schematic diagram of a group user level association system according to another embodiment.

In an embodiment, referring to FIG. 11, FIG. 11 is a structural schematic diagram of a group user level association system according to another embodiment, which may further include a comparison table generating module 50 arranged before the operation-point matching module 20 and configured to select, according to a configuration operation executed by a client, a user operation type used for accumulating a point weight; and generate, according to the selected user operation type and a preset point weight corresponding thereto, a user operation-point weight comparison table and store the user operation-point weight comparison table in the group server, where the client is a client to which a creator or an administrator of the group logs in.

The user level determining module 30 is configured to determine a user level of each user in the group according to the point weight.

The user level determining module 30 may obtain an active degree of each user in the group according to an accumulated point weight, and further determine a user level of a user in the group according to the active degree.

Figure 12:
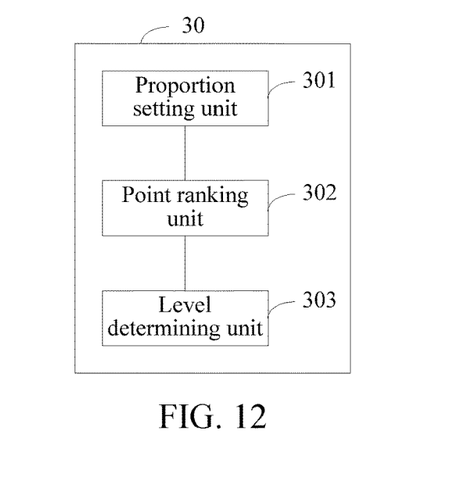
FIG. 12 is a structural schematic diagram of a user level determining module according to an embodiment.

In an embodiment, referring to FIG. 12, FIG. 12 is a structural schematic diagram of a user level determining module according to an embodiment, the user level determining module 30 may further include:

a proportion setting unit 301, configured to set, according to a number of users in the group, a point weight proportion interval corresponding to each user level;

a point ranking unit 302, configured to rank, according to point weights of the users, the users in the group to obtain a user point weight ranking table of the group; and a level determining unit 303, configured to determine a user level of each user in the group according to the point weight proportion interval and the user point weight ranking table.

The user level associating module 40 is configured to associate a user in the group with a user level of the user in the group.

The user level associating module 40 may associate, on the basis of the user level in the group determined by the foregoing user level determining module 30, the user level with a corresponding user in the group, so that in the group, the user level can truthfully and objectively reflect a level difference between users in the group, so as to enable a group owner or an administrator to have higher application or management efficiency when applying or managing the group, and in addition, the user level truthfully reflects an active degree of a user in a group, thereby improving enthusiasm of a user using a group operation and enhancing user experience.

Figure 13:
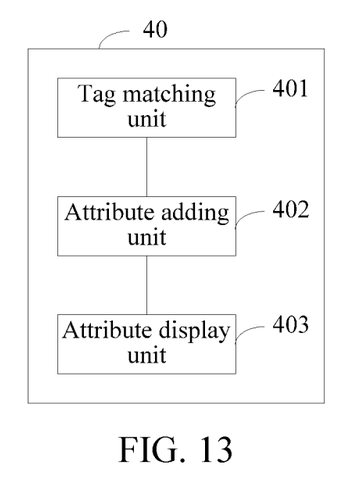
FIG. 13 is a structural schematic diagram of a user level associating module according to an embodiment.

In an embodiment, referring to FIG. 13, FIG. 13 is a structural schematic diagram of a user level associating module according to an embodiment, the user level associating module 40 may further include:

a tag matching unit 401, configured to determine, according to the user level, a level tag matching the user, where each user level in the group matches at least one level tag;

an attribute adding unit 402, configured to add the matched level tag of each user into attribute information of the user; and an attribute display unit 403, configured to send the attribute information to a client and display the attribute information in a group member list of a group chat window.

Figure 14:
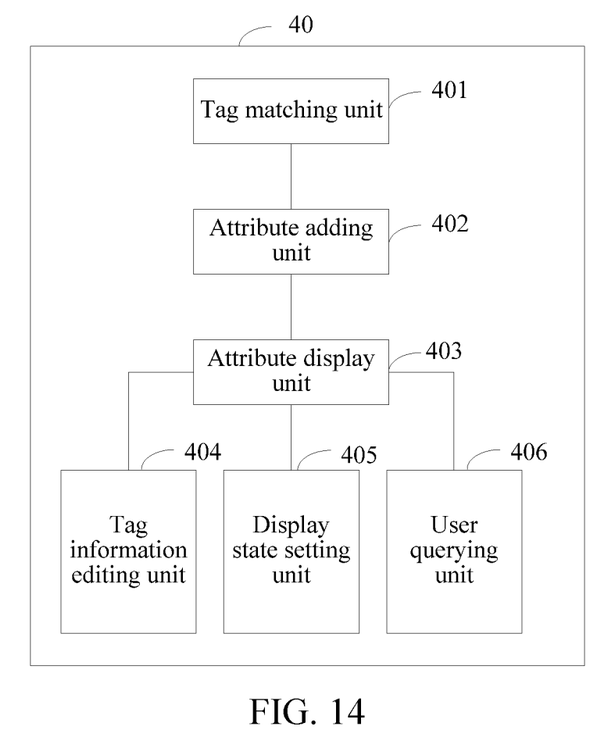
FIG. 14 is a structural schematic diagram of a user level associating module according to another embodiment.

In an embodiment, referring to FIG. 14, FIG. 14 is a structural schematic diagram of a user level associating module according to another embodiment, where the user level associating module 40 may further include: a tag information editing unit 404, configured to edit, according to a configuration operation executed by a client, level tag information of the user in the group and update the level tag information to the attribute information of the user, where the client is a client to which a creator or an administrator of the group logs in.

Further, the user level associating module 40 may further include a display state setting unit 405, configured to set, according to a configuration operation executed by a client, a display state of the level tag information of the user in the group member list, where the client is a client to which a creator or an administrator of the group logs in.

Further, the user level associating module 40 may further include a user querying unit 406, configured to obtain a query operation of the client and perform grouped arrangement on the users in the group according to user levels to obtain a grouped display layout of the group; and display, according to the grouped display layout, the group member list on the group chat window.

Figure 15:
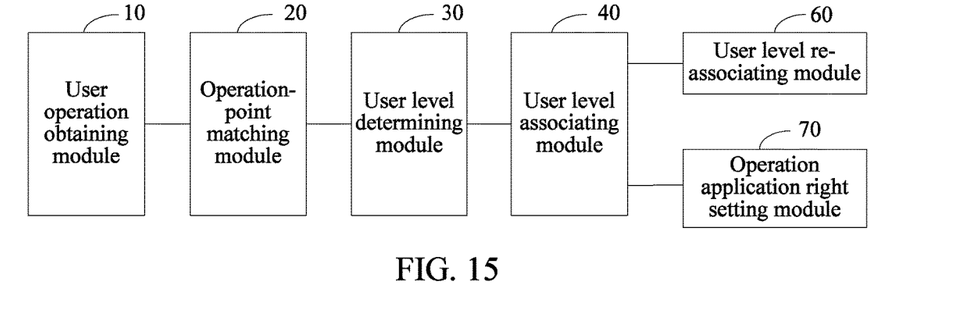
FIG. 15 is a structural schematic diagram of a group user level association system according to still another embodiment.

In an embodiment, referring to FIG. 15, FIG. 15 is a structural schematic diagram of a group user level association system according to still another embodiment, further including, after the user level associating module 40, a user level re-associating module 60, configured to obtain user information, a leave time, and a user level of a user leaving the group and store them in a group server; associate, if the user rejoins the group within a set time, the user level of the user when leaving the group with the user and recover a point weight of the user; and associate, if the user rejoins the group outside a set time, a lowest user level of the group with the user and set the point weight of the user to 0.

Further, after the user level associating module 40, it may include an operation application right setting module 70, configured to set an operation application right for each user level in the group; associate, according to a user level of each user in the group, each user in the group with an operation application right corresponding to the each user; and respond, when receiving an operation application service request initiated by a user, to the operation application service request according to the operation application right associated with the user.

The group user level association system of the present disclosure has one-to-one correspondence with the group user level association method of the present disclosure. Technical features and beneficial effects thereof described in the embodiments of the foregoing group user level association method are all applicable to the embodiments of the group user level association system, which is particularly stated.

Persons of ordinary skill in the art should understand that all or a part of the steps of the method according to the embodiments may be implemented by a program instructing relevant hardware. The program may be stored in a computer readable storage medium. When the program is run, the processes of embodiments of the foregoing methods may be included. The storage medium may be a magnetic disk, an optical disc, a Read-Only Memory (ROM), a Random Access Memory (RAM), or the like.

According to the foregoing solutions of the embodiments of the present invention, the present disclosure further provides a storage medium including a computer-readable program, and when the computer-readable program in the storage medium is run, a state recovering method of a multi-person communication platform of the present disclosure according to any one of the foregoing manners can be implemented.

The method according to the foregoing embodiments of the present invention may be installed on a corresponding machine device in a form of software, and when the software is running, the foregoing group user level association process is completed by controlling a relevant processing device. Accordingly, the machine device may be arranged and mounted on a corresponding terminal device or may be the corresponding terminal device per se, and the terminal device therein may be any terminal device such as a mobile phone, a tablet computer, a Personal Digital Assistant (PDA), a Point of Sales (POS), or a vehicle-mounted computer.

Hence, the basis of the group user level association method and system, the present invention further provides a terminal device, where the terminal device may be any possible terminal device, which may need a service provided by a group, such as a mobile phone, a tablet computer, a Personal Digital Assistant (PDA), a Point of Sales (POS), or a vehicle-mounted computer.

Figure 16:
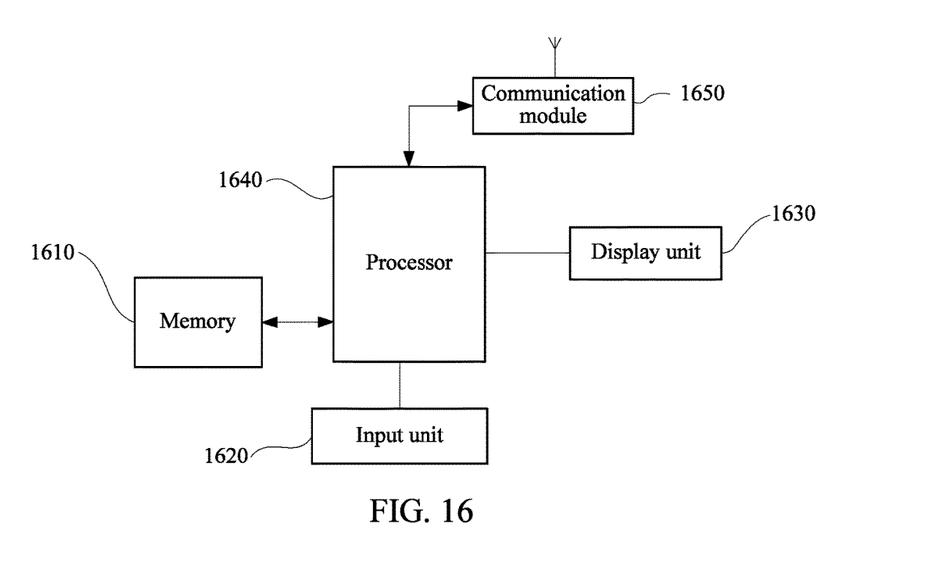
FIG. 16 is a partial structural block diagram of a terminal device according to an embodiment.

Hence, one of the terminal devices is used as an example below, and FIG. 16 shows a partial structural block diagram of the terminal device. Referring to FIG. 16, the terminal device includes components such as a memory 1610, an input unit 1620, a display unit 1630, a processor 1640, and a communication module 1650. It should be understood by persons skilled in the art that the structure shown in FIG. 16 is merely a block diagram of a partial structure related to the solution of the embodiment of the present invention instead of constituting a limitation to the terminal device applied to the solution of the present disclosure, and a specific terminal device may include more or less components than those shown in the drawing, or a combination of some components, or different component layouts.

Each constituent component of the terminal device is specifically introduced below by referring to FIG. 16.

The memory 1610 may be configured to store a software program and module. The processor 1640 runs the software program and module stored in the memory 1610, to implement various functional applications and data processing of the terminal device. The memory 1610 may mainly include a program storage area and a data storage area. The program storage area may store an operating system, an application program required by at least one function (such as a sound playback function and an image display function), and the like. The data storage area may store data (such as audio data and an address book) created according to use of the terminal device, and the like. In addition, the memory 1610 may include a high speed random access memory, and may also include a non-volatile memory such as at least one magnetic disk storage device, a flash memory, or another volatile solid-state storage device.

The input unit 1620 may be configured to receive input digit or character information, and generate a keyboard signal input related to the user setting and function control of the mobile terminal. Specifically, in the solution of the embodiment of the present invention, a user operation is input by using the input unit 1620.

Specifically, if, for example, the terminal device is a mobile phone, the input unit 1620 may include a touch panel and another input device. The touch panel, which may also be referred to as a touch screen, may collect a touch operation of a user on or near the touch panel (such as an operation of a user on or near the touch panel 631 by using any suitable object or accessory such as a finger or a stylus), and drive a corresponding connection apparatus according to a preset program. The touch panel may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, sends the touch point coordinates to the processor 1640, and can receive and execute a command sent from the processor 1640. In addition, the touch panel may be a resistive, capacitive, infrared, or surface sound wave type touch panel. In addition to the touch panel, the input unit 1620 may further include the another input device. Specifically, the another input device 632 may include, but is not limited to, one or more of a physical keyboard, a functional key (such as a volume control key or a switch key), a track ball, a mouse, and a joystick The display unit 1630 may be configured to display information input by the user or information provided for the user, and various menus. Optionally, the display panel 1630 may include a display panel, for example, a liquid crystal display (LCD) or an organic light-emitting diode (OLED) panel. Specifically, in the present embodiment, a client may be displayed by using the display unit 1630 to users in a group member list of a group chat window.

The terminal device implement communication with a server through the communication module 1650, and the communication module 1650 may be implemented in any possible manners, for example, a WiFi module, Bluetooth communication, optical fiber communication, and the like. Communication between the terminal device and the server is implemented through the communication module 1650, so that the terminal device can send relevant information to a server end (for example, in the embodiment of the present invention, the client sends information related to a user operation to a group server) and receive relevant information returned by the server end (for example, the group server sends attribute information of a relevant user to each client).

The processor 1640 is the control center of the terminal device, and is connected to each part of the whole terminal device by using various interfaces and lines. By running or executing the software program and/or module stored in the memory 1610, and invoking data stored in the memory 1610, the processor 1640 performs various functions and data processing of the terminal device, thereby performing overall monitoring on the terminal device. Optionally, the processor 1640 may include one or more processing units.

The foregoing embodiments only describe several implementation manners of the present disclosure, and their description is specific and detailed, but cannot therefore be understood as a limitation to the patent scope of the present disclosure. It should be noted that persons of ordinary skill in the art may further make variations and improvements without departing from the conception of the present disclosure, and these all fall within the protection scope of the present disclosure. Therefore, the patent protection scope of the present disclosure should be subject to the appended claims.

What is claimed is:

1. A group user level association method, comprising:
obtaining, by a device comprising a memory storing instructions and a processor in communication with the memory, user operation information of each user in a group;
matching, by the device, the user operation information with a pre-stored user operation-point weight comparison table to obtain a basic point weight of a user, wherein the basic point weight comprises: a basic point weight for speaking, a basic point weight for uploading a file, a basic point weight for a file being downloaded, a basic point weight for uploading a picture, a basic point weight for a group check-in, and a basic point weight for completing a group task,
extracting, by the device, user operation information of the user within a set time period;
determining, by the device according to a frequency at which a user operation is executed by the user within the set time period, a current point weight coefficient of the user, wherein the user operation comprises: speaking in the group, uploading a file to the group, a file being downloaded, uploading a picture to the group, a group check-in, and completing a group task;
calculating, by the device, according to the basic point weight and the point weight coefficient, a point weight of the user;
determining, by the device, a user level of each user in the group according to a point weight proportion interval and a user point weight ranking table;
associating, by the device, a user in the group with a user level of the user in the group;
obtaining, by the device, user information, a leave time, and a user level of a user who leaves the group, and storing the user information, the leave time, and the user level of the leaving user in a group server;
in response to the leaving user rejoins the group within a preset time, associating, by the device, the user level of the leaving user with the rejoining user and recovering a point weight of the rejoining user;
in response to the leaving user rejoins the group outside the preset time, associating, by the device, a lowest user level of the group with the rejoining user and setting the point weight of the rejoining user to 0;
after the extracting the user operation information of the user within the set time period, further comprising:
determining, by the device, a maximum of a number of continuous speaking days of the user within the set time period, and setting, according to the maximum, a current point weight coefficient for speaking of the user, wherein
the calculating, according to the basic point weight and the point weight coefficient, the point weight of the user comprises the following formula:

$$Q=Q_0*a+\Sigma Q_n+S, n\in(1,5)$$

wherein Q is the point weight of the user, a is the point weight coefficient for speaking, $Q_0$ is the basic point weight, $Q_1$ is the basic point weight for uploading a file, $Q_2$ is the basic point weight for a file being downloaded, $Q_3$ is the point weight for uploading a picture, $Q_4$ is the basic point weight for a group check-in, $Q_5$ is the basic point weight for completing a group task, and S is a set bonus point weight for the number of continuous speaking days; and
wherein the associating the user with the user level of the user in the group comprises:
determining, by the device according to the user level, a level tag matching the user, wherein each user level in the group matches at least one level tag,
adding, by the device, the matched level tag of each user into attribute information of the user, and
sending, by the device, the attribute information to a client and displaying the attribute information in a group member list of a group chat window.

2. The method according to claim 1, wherein the obtaining the user operation information of each user in a group comprises:
obtaining, by the device, a user operation executed by each client in the group by using a group server;
recording, by the device, user information, an operation type, and an operation time of each user operation; and
generating, by the device, the user operation information from the user information, operation type, and operation time, and storing the user operation information in the group server.

3. The method according to claim 1, further comprising:
selecting, by the device according to a configuration operation executed by a client, a user operation type used for accumulating a point weight; and
generating, by the device, according the selected user operation type and a preset point weight corresponding thereto, a user operation-point weight comparison table and storing the user operation-point weight comparison table in the group server, wherein
the client is a client to which a creator or an administrator of the group logs in.

4. The method according to claim 1, wherein the determining the user level of each user in the group according to the point weight proportion interval and the user point weight ranking table comprises:
setting, by the device according to a number of users in the group, the point weight proportion interval corresponding to each user level;
ranking, by the device according to point weights of the users, the users in the group to obtain the user point weight ranking table of the group; and
determining, by the device, the user level of each user in the group according to the point weight proportion interval and the user point weight ranking table.

5. The method according to claim 1, wherein:
the set bonus point weight is a negative value when a maximum of the number of continuous speaking days is less than a preset first threshold; and the set bonus point weight is a positive value when the maximum of the number of continuous speaking days is greater than a preset first threshold.

6. The method according to claim 1, further comprising:
editing, by the device according to a configuration operation executed by a client, level tag information of the user in the group and updating the level tag information to the attribute information of the user, wherein
the client is a client to which a creator or an administrator of the group logs in.

7. The method according to claim 1, further comprising:
setting, by the device according to a configuration operation executed by a client, a display state of level tag information of the user in the group member list, wherein
the client is a client to which a creator or an administrator of the group logs in.

8. The method according to claim 1, further comprising:
obtaining, by the device, a query operation of the client and performing grouped arrangement on the users in the group according to user levels to obtain a grouped display layout of the group; and
displaying, by the device according to the grouped display layout, the group member list on the group chat window.

9. The method according to claim 1, wherein the associating the user with the user level of the user in the group comprises:
setting, by the device, an operation application right for each user level in the group;
associating, by the device according to a user level of each user in the group, each user in the group with an operation application right corresponding to the each user; and
responding, by the device when receiving an operation application service request initiated by a user, to the operation application service request according to the operation application right associated with the user.

10. A system for group user level association, the system comprising:
a memory storing instructions;
a processor in communication with the memory, wherein, when the processor executes the instructions, the processor is configured to cause the system to:
obtain user operation information of each user in a group;
match the user operation information with a pre-stored user operation-point weight comparison table to obtain a basic point weight of a user, wherein the basic point weight comprises: a basic point weight for speaking, a basic point weight for uploading a file, a basic point weight for a file being downloaded, a basic point weight for uploading a picture, a basic point weight for a group check-in, and a basic point weight for completing a group task;
extract user operation information of the user within a set time period;
determine, according to a frequency at which a user operation is executed by the user within the set time period, a current point weight coefficient of the user, wherein the user operation comprises: speaking in the group, uploading a file to the group, a file being downloaded, uploading a picture to the group, a group check-in, and completing a group task;
calculate, according to the basic point weight and the point weight coefficient, a point weight of the user;
determine a user level of each user in the group according to a point weight proportion interval and a user point weight ranking table;
associate a user in the group with a user level of the user in the group;
obtain user information, a leave time, and a user level of a user who leaves the group, and storing the user information, the leave time, and the user level of the leaving user in a group server;
in response to the leaving user rejoins the group within a preset time, associate the user level of the leaving user with the rejoining user and recovering a point weight of the rejoining user; and
in response to the leaving user rejoins the group outside the preset time, associate a lowest user level of the group with the rejoining user and setting the point weight of the rejoining user to 0; and
wherein, after the processor is configured to cause the system to extract the user operation information of the user within the set time period, the processor is configured to cause the system to: determine a maximum of a number of continuous speaking days of the user within the set time period, and set, according to the maximum, a current point weight coefficient for speaking of the user; and
calculate, according to the basic point weight and the point weight coefficient, the point weight of the user, wherein a process comprises the following formula:

$$Q=Q_0*a+\Sigma Q_n+S, n\in(1,5)$$

wherein Q is a point weight of the user, a is the point weight coefficient for speaking, $Q_0$ is the basic point weight, $Q_1$ is the basic point weight for uploading a file, $Q_2$ is the basic point weight for a file being downloaded, $Q_3$ is the point weight for uploading a picture, $Q_4$ is the basic point weight for a group check-in, $Q_5$ is the basic point weight for completing a group task, and S is a set bonus point weight for the number of continuous speaking days; and
wherein, when the processor is configured to cause the system to associate the user with the user level of the user in the group, the processor is configured to cause the system to:
determine, according to the user level, a level tag matching the user, wherein each user level in the group matches at least one level tag,
add the matched level tag of each user into attribute information of the user, and
send the attribute information to a client and displaying the attribute information in a group member list of a group chat window.

11. The system according to claim 10, wherein, when the processor executes the instructions, the processor is configured to further cause the system to:
obtain a user operation executed by each client in the group by using a group server;
record user information, an operation type, and an operation time of each user operation; and
generate the user operation information from the user information, operation type, and operation time, and store the user operation information in the group server.

12. The system according to claim 10, wherein, when the processor executes the instructions, the processor is configured to further cause the system to:
select, according to a configuration operation executed by a client, a user operation type used for accumulating a point weight; and generate, according the selected user operation type and a preset point weight corresponding thereto, a user operation-point weight comparison table and store the user operation-point weight comparison table in the group server, wherein the client is a client to which a creator or an administrator of the group logs in.

13. The system according to claim 10, wherein, when the processor is configured to cause the system to determine the user level of each user in the group according to the point weight proportion interval and the user point weight ranking table, the processor is configured to cause the system to:
- set, according to a number of users in the group, the point weight proportion interval corresponding to each user level;
- rank, according to point weights of the users, the users in the group to obtain the user point weight ranking table of the group; and
- determine the user level of each user in the group according to the point weight proportion interval and the user point weight ranking table.

* * * * *